July 12, 1932.  P. N. MADSEN  1,867,366
PARACHUTE
Filed June 30, 1931   3 Sheets-Sheet 3
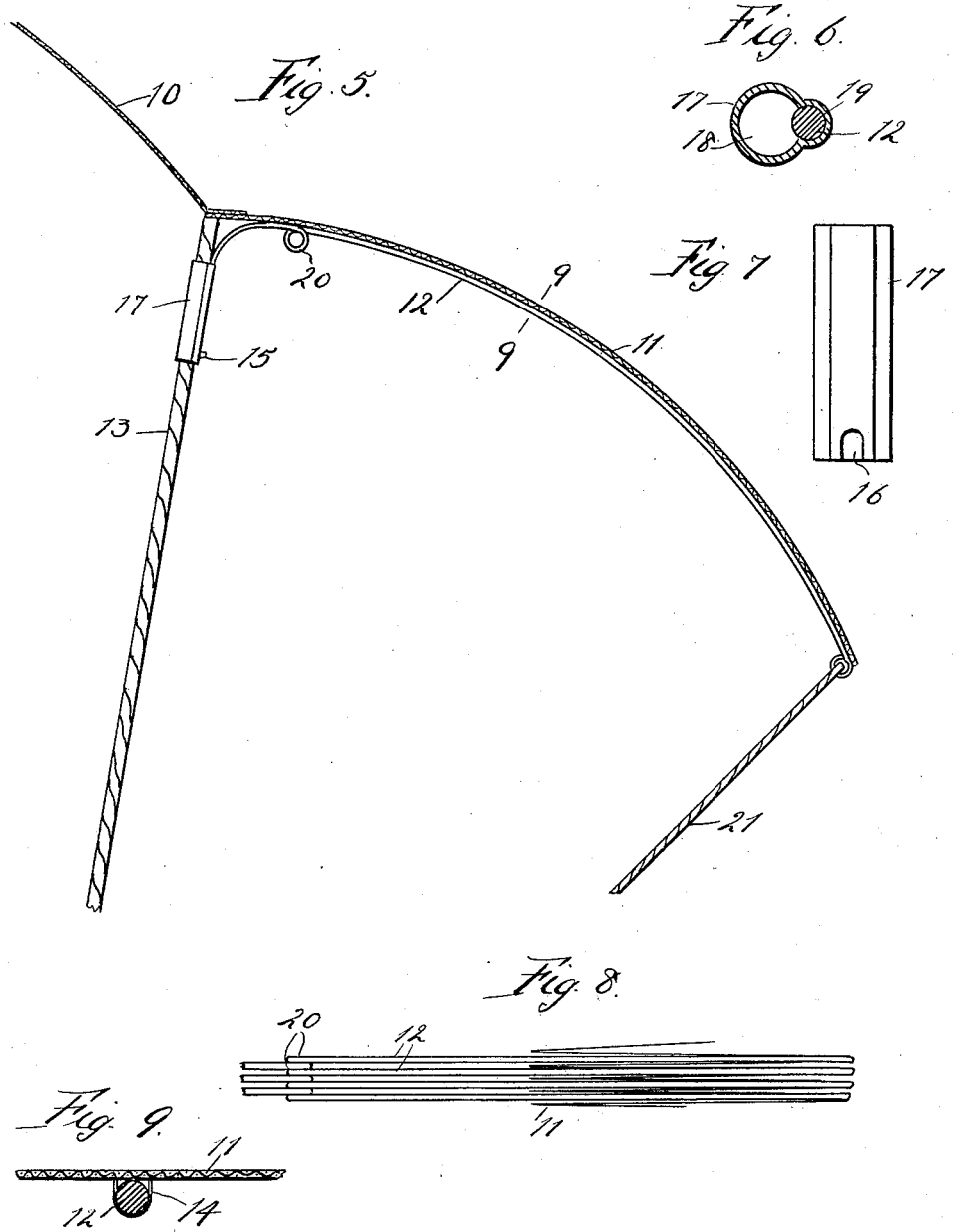
INVENTOR
Peter N. Madsen
By W. W. Williamson
Atty.

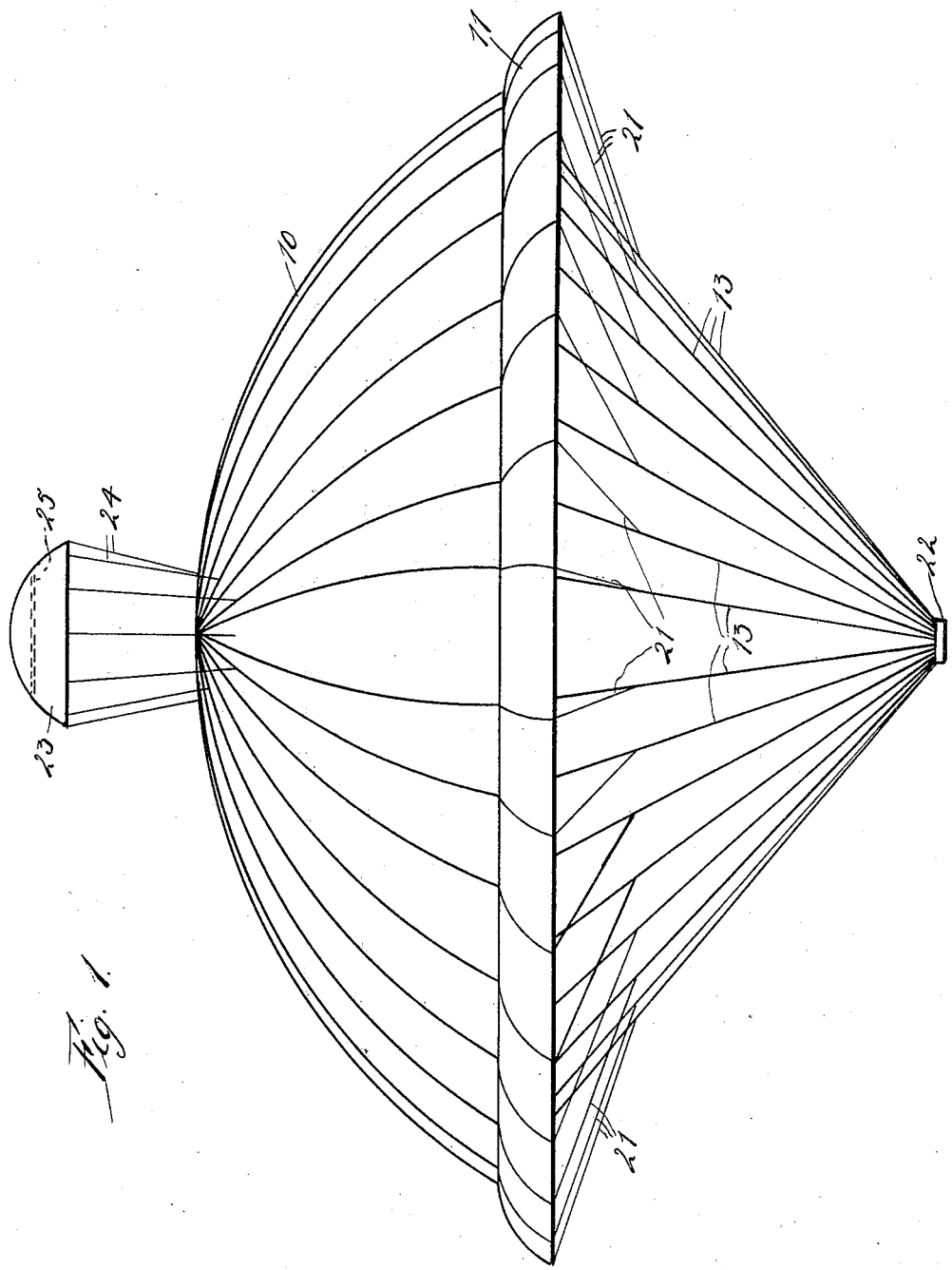

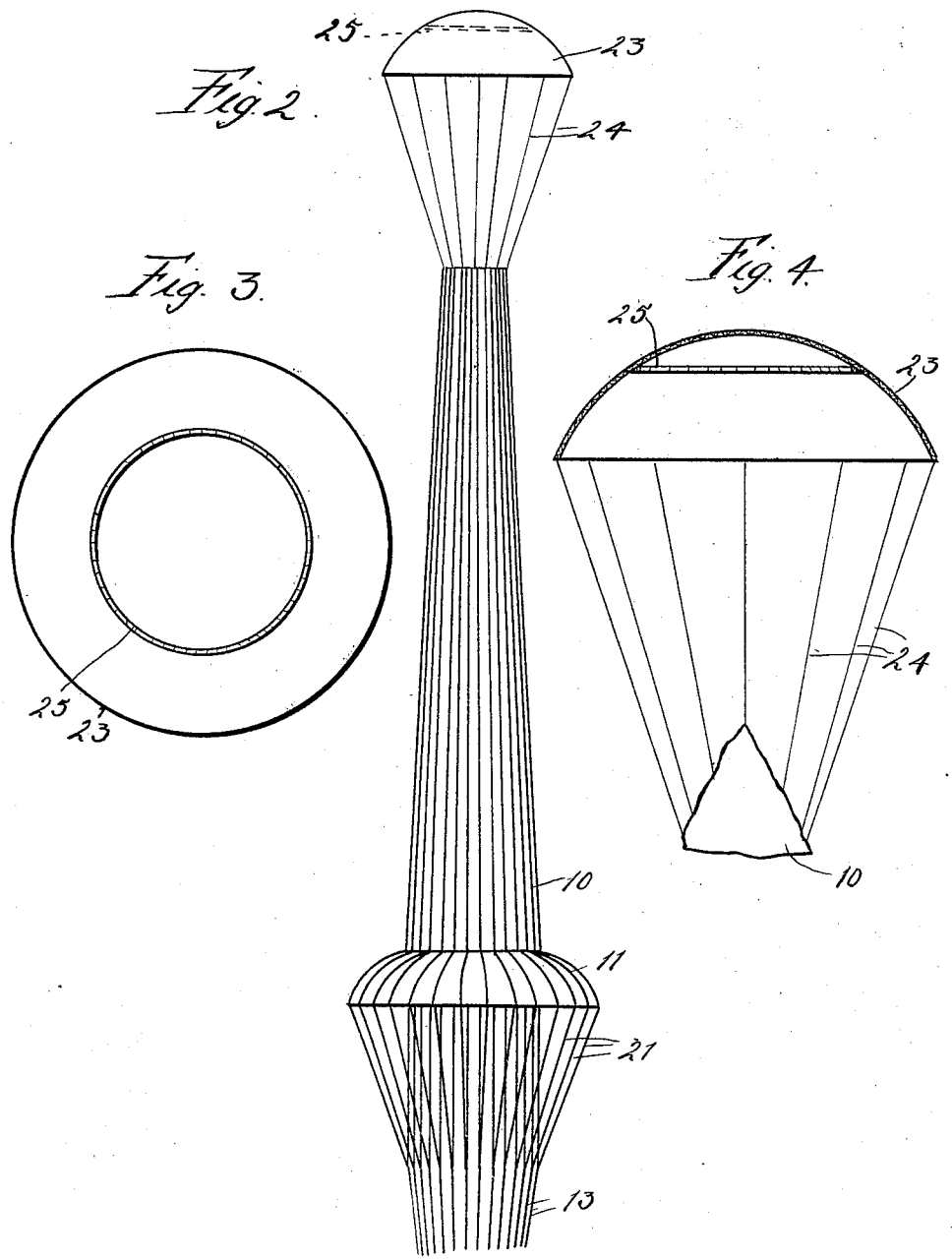

Patented July 12, 1932

1,867,366

UNITED STATES PATENT OFFICE

PETER N. MADSEN, OF BROOKLINE, PENNSYLVANIA

PARACHUTE

Application filed June 30, 1931. Serial No. 547,808.

My invention relates to new and useful improvements in a parachute, and has for one of its objects to provide a simple and effective structure which will insure the positive opening of the parachute.

Another object of the invention is to provide a parachute consisting of a main parachute and a pilot parachute, the latter having means to retain said pilot parachute in a spread condition or at least to hold a portion thereof out-stretched.

Another object of the invention is to provide a device of the kind described including main and pilot parachutes, each provided with means to insure the opening thereof.

Another object of the invention is to provide a safety device consisting of main and pilot parachutes, the former being provided with a surrounding skirt about its lower or free edge which will open as soon as the parachute is released to form a mouth for directing air into the main parachute.

A further object of the invention is to provide a parachute including a main parachute, the lower end of which is surrounded by a skirt having spring wires to maintain said skirt in proper shape and cause the latter to assume an open position upon the release of the parachute and the tightening of the ropes, said spring wires having their inner ends clamped by means of sleeves to the shroud lines.

A still further object of the invention is to place a spring wire ring within the pilot parachute to hold a portion thereof out-stretched.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a side elevation of a parachute constructed in accordance with my invention as it would appear during descent and when fully open.

Fig. 2 is a similar view as it would appear at some particular moment after being released and as all of the parts have been drawn taut but the main parachute not yet opened.

Fig. 3 is an enlarged view looking into the pilot parachute without its attaching lines or ropes.

Fig. 4 is a vertical sectional view of the pilot parachute.

Fig. 5 is a further enlarged fragmentary vertical sectional view of the main parachute and its skirt.

Fig. 6 is an enlarged cross section of the clamping sleeve and the spring wire removed from the shroud line.

Fig. 7 is an enlarged side elevation of the clamping sleeve at right angles to the illustration in Fig. 5.

Fig. 8 is a fragmentary view of the skirt illustrating the manner in which it is folded in making up the parachute pack.

Fig. 9 is an enlarged section on the line 9—9 of Fig. 5.

In carrying out my invention as herein embodied, 10 represents the main parachute to the lower or free edge of which is attached a skirt 11 so as to completely surround the bottom or open portion and is normally held in an out-stretched condition as shown in Figs. 1, 2 and 5, by means of spring wires 12.

Any number of these wires are used although preferably there is one for each shroud line 13 and the main body portions or the longer parts of said wires are bowed and attached in any suitable manner as by stitches 14, Fig. 9, to the inside of the skirt 11 so that said skirt assumes a spherical curve or is arcuate in cross section with the outer edge some distance below the inner edge as plainly shown in Fig. 5.

The inner end of each wire is bent to assume a position parallel with a shroud line 13 as illustrated in Fig. 5, and the inner terminal is bent outward to produce a finger 15 which will register with a notch 16 in the lower end of the clamp 17, preferably in the form of a sleeve and so fashioned as to provide a chamber 18 for the reception of the shroud line and an auxiliary chamber 19 for the reception of the inner end of the spring wire 12 as will be obvious by reference to Fig. 6. The clamp 17 is permanently fixed on a shroud line by pinching or squeezing the same place with the wire in position. The clamp will thus become partially embedded in the shroud line so that it cannot work loose and the finger 15 registering with the notch 16 will prevent the wire from moving about in the clamp.

Intermediate the ends of the main portion of each spring wire 12 is formed a loop 20 preferably adjacent the inner bent end of said wire as shown in Fig. 5, whereby any adjustments can take place at the loop to reduce the chances of wire breaking at the bend therein.

In order to maintain the outer edge of the skirt in proper relation to the other parts and to anchor or hold said outer edge of the skirt in place to prevent the same from turning back, skirt stay-lines or ropes 21 are attached in any suitable manner to the edge of the skirt and not to the spring wires and then to the shroud lines as shown in Figs. 1 and 2, while the connection of one of said stay-lines with the skirt is shown in Fig. 5. The lower ends of the shroud lines are all connected with the life belt 22 or other equivalent, such as an aviator's harness, a parachute jumper's trapeze or other object by which the trapeze is connected with a person or object which is to be allowed to descend through the air with safety.

As soon as the parachute is released and begins to straighten out as suggested by the illustration in Fig. 2, the tightening of the shroud lines will cause the spring wires 12 to assume out-stretched positions for spreading the skirt as in Fig. 2, thereby producing an extended mouth for the main parachute so as to catch a "pocket" air and direct it into the main parachute to insure the opening of the latter. As the parachute opens, the skirt will be extended to its fullest extent and in reality increases the effective surface of the parachute and will tend to prevent undue swaying.

In packing the parachute or folding the same in making up a pack, the portions of the skirt between the wires 12 are folded inward and the wires positioned one on top of another as suggested by the illustration in Fig. 8, and therefore as soon as the parachute is stretched out they must positively assume the positions shown in Fig. 2, and form the open mouth leading to the parachute.

It might be well to state at this time that these spring wires are never bent in or folded so that there is no umbrella action, but they merely hold the skirt in such a way so that when the parachute is stretched out said skirt is immediately spread and is therefore open to the action of the air.

A pilot parachute 23 of usual construction is connected in the usual manner to the main parachute 10 by means of short lines or ropes 24 and in order to maintain a portion of the pilot parachute out-stretched to insure opening of the same, I fix a spring wire ring 25 inside of the same some distance from the lower or free edge so that the upper part or dome of the pilot parachute will always be held in an out-stretched or spread condition as shown in Figs. 2, 3 and 4. It will be obvious that when the parachute is first released, the central part thereof will be in a spread or out-stretched condition and the portion thereof between the ring 25 and the free edge of the pilot parachute will hang down somewhat like the sides of a tent, but moving through the air it will insure entrance of air into the pilot parachute and cause it to open prior to the opening of the main parachute as shown in Fig. 2, and will remain open even after the main parachute is opened as shown in Fig. 1.

In making up the pack the pilot parachute is folded and put in place last so that just as soon as the complete parachute is released the pilot parachute will be opened to provide the necessary "drag" to cause the parts of the main parachute to become taut and since the lower end of the main parachute is fed with air directed thereto by the out-stretched skirt, said main parachute will positively open until all of the parts assume positions illustrated in Fig. 1.

From the foregoing description, it will be seen that I have produced a parachute which will be absolutely safe in operation and in which the opening thereof will be insured.

Of course, I do not wish to be limited to the exact details of construction herein shown and described as these may be varied within the limits of the appended claims without departing from the spirit of my invention.

Having thus fully described my invention, what I claim as new and useful is:—

1. In a device of the kind described, a main parachute, shroud lines connected therewith, a skirt connected with the edge of the main parachute and completely encircling the same, stay-lines connected with the free edge of said skirt and the shroud lines, supporting means carried by the shroud lines and attached to the skirt for maintaining the same out-stretched, a pilot parachute, lines connected to the edge of the pilot parachute with the main parachute, and a ring connected to the pilot parachute inside of the same.

2. A parachute, shroud lines connected therewith, a skirt attached to the free edge of the parachute and projecting outside of the latter, stay-lines connected with the free edge of the skirt and the shroud lines, spring wires underlying the skirt and connected therewith and having their inner ends fashioned to parallel the shroud lines and clamps for fixing the inner ends of said wires to the shroud lines.

3. The structure set forth in claim 2, wherein the spring wires have loops formed in the portions connected with the skirt adjacent the inner ends, and fingers bent up from the inner ends for registration with notches in the clamps to prevent rotation of the wires in said clamps.

In testimony whereof, I have hereunto affixed my signature.

PETER N. MADSEN.